(12) United States Patent
Lee et al.

(10) Patent No.: US 7,990,368 B2
(45) Date of Patent: Aug. 2, 2011

(54) METHOD FOR CALIBRATING COORDINATES OF TOUCH SCREEN

(75) Inventors: Chia-Yi Lee, Taichung (TW); Wen-Kai Lee, Kaohsiung (TW)

(73) Assignee: Elan Microelectronics Corp., Hsin-Chu (TW)

( * ) Notice: Subject to any disclaimer, the term of this patent is extended or adjusted under 35 U.S.C. 154(b) by 645 days.

(21) Appl. No.: 12/123,677

(22) Filed: May 20, 2008

(65) Prior Publication Data

US 2009/0167725 A1    Jul. 2, 2009

Related U.S. Application Data

(60) Provisional application No. 61/016,754, filed on Dec. 26, 2007.

(30) Foreign Application Priority Data

Apr. 1, 2008   (TW) .............................. 97111811 A

(51) Int. Cl.
G06F 3/041    (2006.01)

(52) U.S. Cl. ........................................ 345/178; 345/173

(58) Field of Classification Search .................. 345/173, 345/178; 178/19.03
See application file for complete search history.

(56) References Cited

U.S. PATENT DOCUMENTS 6,456,952 B1 *   9/2002   Nathan ........................... 702/94

\* cited by examiner

*Primary Examiner* — Kevin M Nguyen
*Assistant Examiner* — Sepideh Ghafari
(74) *Attorney, Agent, or Firm* — Muncy, Geissler, Olds & Lowe, PLLC

(57) ABSTRACT

A method for calibrating coordinates of a touch screen includes the steps of: providing a display panel, which includes display coordinates along a first axis and a first axis display coordinate; providing a capacitive sensor, which includes sensing electrodes disposed along the first axis and respectively corresponding to sensing coordinates, wherein capacitive sensor has a maximum sensing coordinate; detecting digital values corresponding to the sensing electrodes when the capacitive sensor is touched; multiplying the digital values by the sensing coordinates corresponding to the sensing electrodes to obtain a weighting value; dividing the weighting value by the maximum sensing coordinate to obtain an interpolated value; and multiplying the interpolated value by the first axis display coordinate to obtain a calibrated coordinate.

17 Claims, 17 Drawing Sheets

METHOD FOR CALIBRATING COORDINATES OF TOUCH SCREEN

This application claims priority of U.S. Provisional Application No. 61/016,754 filed on Dec. 26, 2007 under 35 USC 119, the entire contents of which are hereby incorporated by reference.

BACKGROUND OF THE INVENTION

1. Field of Invention

The invention relates in general to the indicator positioning technology, and more particularly to a method for calibrating coordinates of a touch screen.

2. Brief Discussion of the Related Art

Recently, the technology is rapidly developed. A handheld device, such as a smart mobile phone, a personal digital assistant (PDA), a global positioning system (GPS), or the like, has become more and more popularized. The above-mentioned devices have touch screens, so the calibrating technology between a touch sensor and a display device become very important. In the past, a resistive touch sensor is usually used. The resistive sensor has to sense the coordinates of indicators on the screen by way of pressure sensing. A liquid crystal display is usually used in the handheld device and the resistive sensor also has to overlap with the liquid crystal display. Thus, when the resistive sensor is pressed, the liquid crystal display is also pressed. After a long period of time, the liquid crystal display may be damaged. In addition, the resolution of the resistive sensor is lower, and the condition of the unprecise coordinate positioning tends to occur.

In the prior art, a capacitive touch sensor is also used. The capacitive sensor is widely applied to the touch screen of the handheld device. However, when the capacitive sensor is applied to the touch screen, the problem of precision exists due to the mismatch between the coordinate arrangements of the capacitive touch pad and the display.

SUMMARY OF THE INVENTION

It is therefore an object of the invention to provide a method for calibrating coordinates of a touch screen to solve the problem of mismatch between the coordinate arrangements of the capacitive touch pad and the display.

Another object of the invention is to provide a method for calibrating coordinates of a touch screen in order to transfer the coordinate of the capacitive sensor into the coordinate of the display panel.

To achieve the above-identified or other objects, the invention provides a method for calibrating coordinates of a touch screen. The method includes the steps of: providing a display panel, which comprises a plurality of display coordinates along a first axis and a first axis display coordinate; providing a capacitive sensor, which comprises a plurality of sensing electrodes disposed along the first axis and respectively corresponding to a plurality of sensing coordinates, wherein the capacitive sensor has a maximum sensing coordinate; detecting a plurality of digital values corresponding to the sensing electrodes when the capacitive sensor is touched; multiplying the digital values by the sensing coordinates corresponding to the sensing electrodes to obtain a weighting value; dividing the weighting value by a sum of the digital values to obtain an interpolated value; and multiplying the interpolated value by the first axis display coordinate to obtain a calibrated coordinate.

In addition, the invention provides a method for calibrating coordinates of a touch screen. The method includes the steps of: providing a display panel, which comprises a plurality of display coordinates along a first axis and a first axis display coordinate; providing a capacitive sensor, which comprises a plurality of sensing electrodes disposed along the first axis and respectively corresponding to a plurality of sensing coordinates, wherein the capacitive sensor has a maximum sensing coordinate, and the coordinate corresponding to a first specific sensing electrode, which is nearest to a first edge of the capacitive sensor, is an initial value, and the coordinate corresponding to a second specific sensing electrode, which is nearest to a second edge of the capacitive sensor, is the same as the maximum sensing coordinate; when the first edge is located at a minimum display coordinate of the display panel and the second edge is located at a maximum display coordinate of the display panel: summing up the sensing coordinates, corresponding to the sensing electrodes, and a default coordinate to replace the sensing coordinates; and summing up the maximum sensing coordinate and two times of the default coordinate to replace the maximum sensing coordinate, wherein the maximum sensing coordinate is the coordinate of the second edge; when it is detected that the first specific sensing electrode, which is nearest to the first edge, is touched: judging whether a digital value corresponding to the first specific sensing electrode is greater than a reference digital value or not; determining a first edge sensing coordinate according to a ratio of the digital value, corresponding to the first specific sensing electrode, to a default digital value when the digital value corresponding to the first specific sensing electrode is smaller than the reference digital value, wherein the first edge sensing coordinate ranges between the initial value and the sensing coordinate corresponding to the first specific sensing electrode; and dividing the first edge sensing coordinate by the maximum sensing coordinate and than multiplying by the first axis display coordinate to obtain a calibrated coordinate; and when it is detected that the second specific sensing electrode, which is nearest to the second edge, is touched: judging whether a digital value corresponding to the second specific sensing electrode is greater than the reference digital value or not; determining a second edge sensing coordinate according to a ratio of the digital value, corresponding to the second specific sensing electrode, to the default digital value when the digital value corresponding to the second specific sensing electrode is smaller than the reference digital value, wherein the second edge sensing coordinate ranges between the maximum sensing coordinate and the sensing coordinate corresponding to the first specific sensing electrode; and dividing the second edge sensing coordinate by the maximum sensing coordinate and than multiplying by the first axis display coordinate to obtain the calibrated coordinate.

The invention further provides a method for calibrating coordinates of a touch screen. The touch screen includes a display panel and a capacitive sensor. The method includes the steps of: obtaining a coordinate of a touch object along a first axis according to a capacitance variation caused by the touch object with respect to the capacitive sensor; adding the coordinate of the touch object to a calibrating value to obtain a first coordinate; determining a transferring ratio according to theoretical total coordinates of the capacitive sensor along the first axis and a resolution of the display panel along the first axis; and multiplying the first coordinate by the transferring ratio to obtain a second coordinate of the touch object corresponding to the display panel.

The invention further provides a method for calibrating coordinates of a touch screen. The touch screen includes a display panel and a capacitive sensor. The method includes the steps of: detecting a capacitance variation caused by a touch object with respect to the capacitive sensor along a first axis; obtaining a third coordinate corresponding to the capacitance variation according to a look-up table; determining a transferring ratio according to theoretical total coordinates of the capacitive sensor along the first axis and a resolution of the display panel along the first axis; and multiplying the third coordinate by the transferring ratio to obtain a fourth coordinate of the touch object corresponding to the display panel.

One aspect of the invention is to calibrate the coordinate mismatch between the capacitive sensor and the display panel by way of interpolation. On the other hand, because the capacitive sensor has a plurality of sensing electrodes each having a predetermined width, only the coordinate corresponding to the edge sensing electrode can be calculated by way of interpolation when only the edge sensing electrode is touched. Thus, the edge of the display panel cannot be touched. Therefore, another aspect of the invention is to determine the coordinate of the edge according to the digital value corresponding to the equivalent capacitance sensed by the edge sensing electrode. Thus, the problem of mismatch between the coordinate arrangements of the capacitive touch pad and the display can be solved.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
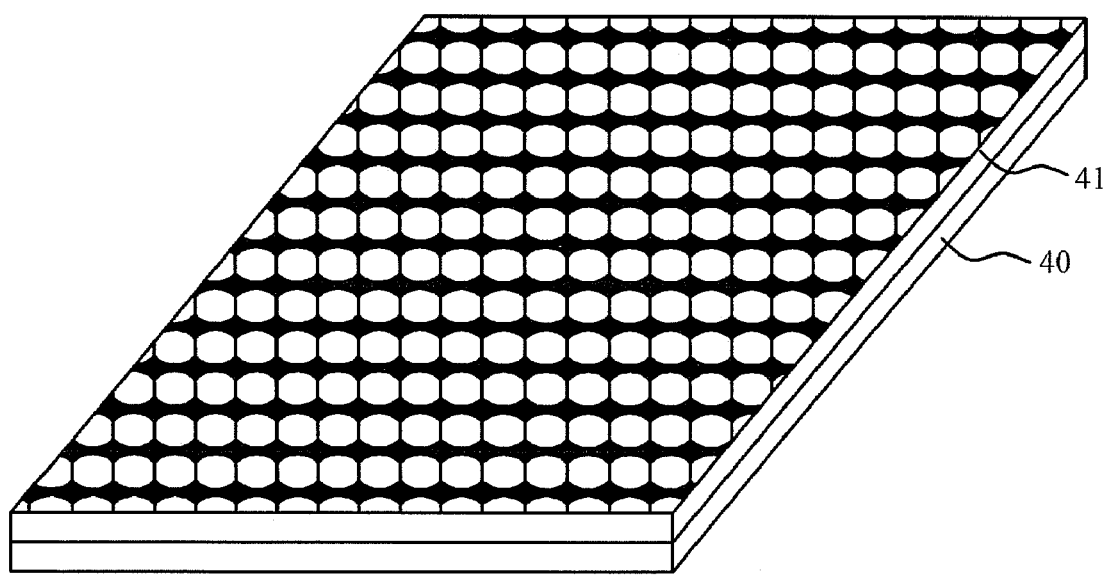
FIG. 1 is a cross-sectional view showing a structure of a capacitive touch screen according to an embodiment of the invention.
Figure 2:
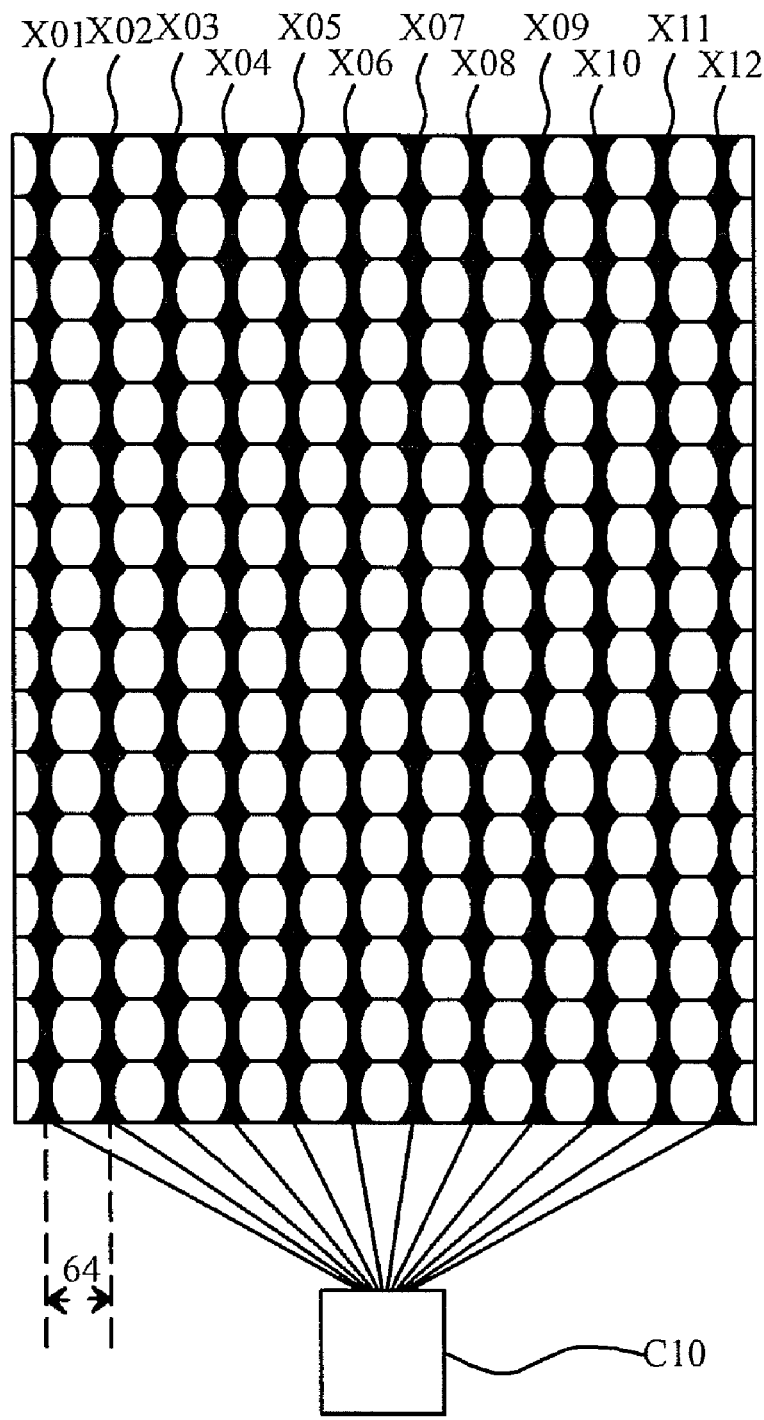
FIG. 2 is a top view showing a structure of a capacitive sensor 41 according to the embodiment of the invention.

FIG. 1 is a cross-sectional view showing a structure of a capacitive touch screen according to an embodiment of the invention. Referring to FIG. 1, the capacitive touch screen includes a display module 40 and a capacitive sensor 41. FIG. 2 is a top view showing a structure of the capacitive sensor 41 according to the embodiment of the invention. Referring to FIG. 2, the capacitive sensor 41 includes a plurality of X-axis sensing electrodes X01 to X12 and a control circuit C10. Because the X-axis coordinate and the Y-axis coordinate have to be provided to position an indicator. In this embodiment, only the method for positioning the X-axis coordinate is illustrated, and the method for positioning the Y-axis coordinate may be the same as that for positioning the X-axis coordinate, and detailed descriptions thereof will be omitted.

The capacitive sensor 41 has two sensing methods including a non-differential sensing method and a differential sensing method. That is, the non-differential sensing method is to obtain a digital value associated with an equivalent capacitance on each X-axis sensing line. The digital value is associated with an area of a conductor, such as a finger touching the X-axis sensing line, or associated with a distance from the conductor to the X-axis sensing electrode. In this embodiment, the X-axis sensing electrodes X01 to X12 are illustrated by taking 12 sensing lines as an example. Generally speaking, a portion between two adjacent X-axis sensing lines may be divided into, for example, 64 coordinate positions. However, the coordinate dividing may be different according to different applications and different precision. In addition, the coordinate of the first X-axis sensing line X01 is 0. Thus, the total number of the X-axis coordinates of the capacitive sensor 41 is equal to $64 \times (12-1)+1=705$. In addition, the differential sensing method is to obtain one digital value every two X-axis sensing electrodes. So, the total number of the X-axis coordinates of the capacitive sensor 41 is equal to $64 \times (12-2)+1=641$. In the following, how the X coordinate on the capacitive sensor 41 is obtained as the finger touches the X-axis sensing electrode will be illustrated according to the non-differential sensing method.

Figure 3A:
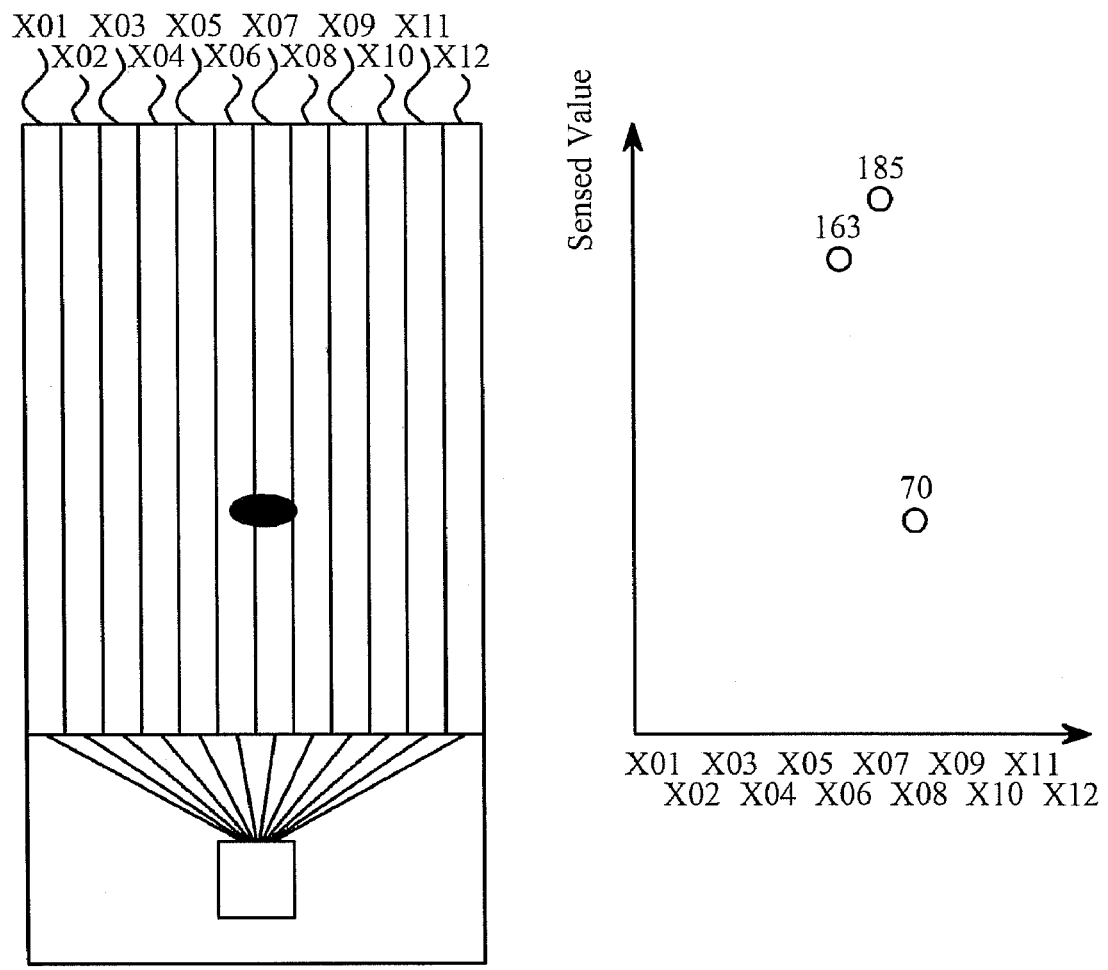
FIGS. 3A and 3B are schematic illustrations showing methods for positioning coordinates of the capacitive sensor 41 according to the embodiment of the invention.
Figure 3B:
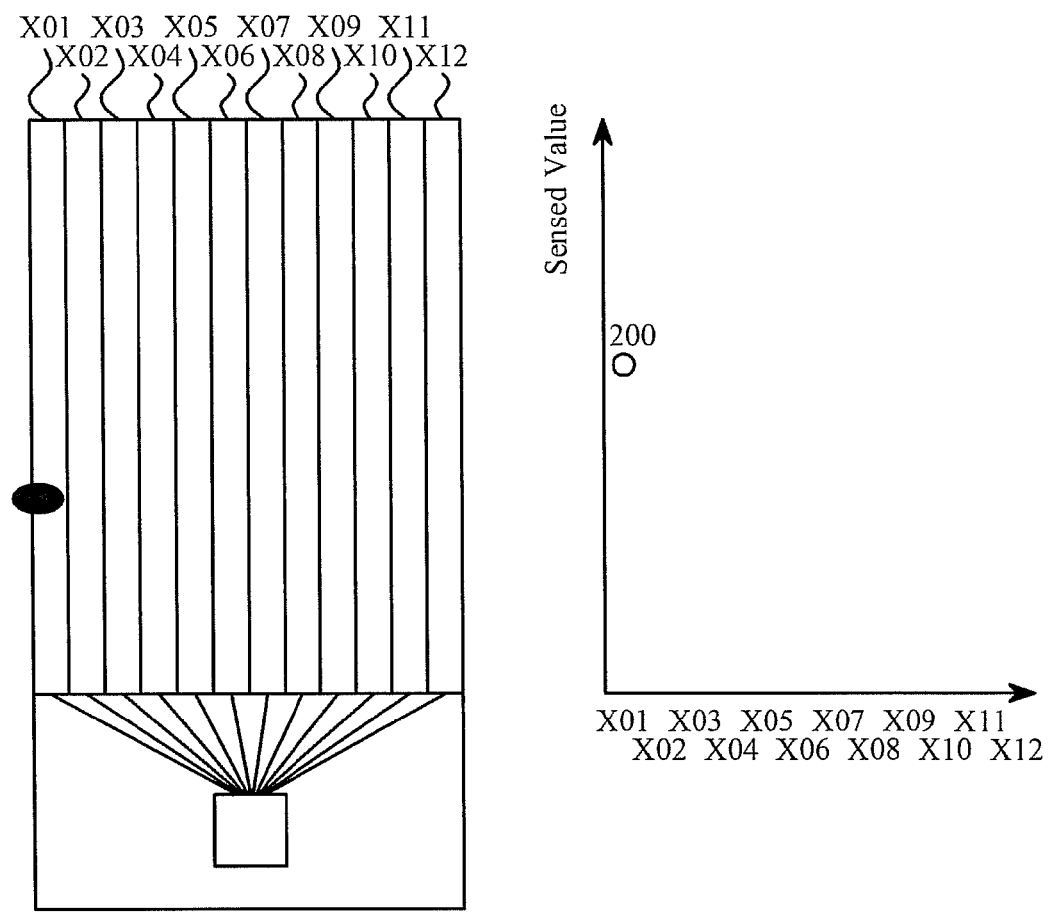

FIGS. 3A and 3B are schematic illustrations showing methods for positioning coordinates of the capacitive sensor 41 according to the embodiment of the invention. As shown in FIG. 3A, it is assumed that the digital value is 0 when the X-axis sensing lines X01 to X12 are not touched. The digital values are 163, 185 and 70 when the sixth to eight X-axis sensing lines X06 to X08 are detected, respectively. Thus, the X-axis coordinate may be calculated by way of interpolation when the finger touches the capacitive sensor 41:

$$64 \times [(6-1) \times 163 + (7-1) \times 185 + (8-1) \times 70]/(163+185+70) = 369.76.$$

Next, as shown in FIG. 3B, when the digital value of the detected first X-axis sensing line X01 is 200, the X-axis coordinate of the capacitive sensor 41 touched by the finger is calculated by way of interpolation:

64×(1−1)×200/200=0.

Figure 4:
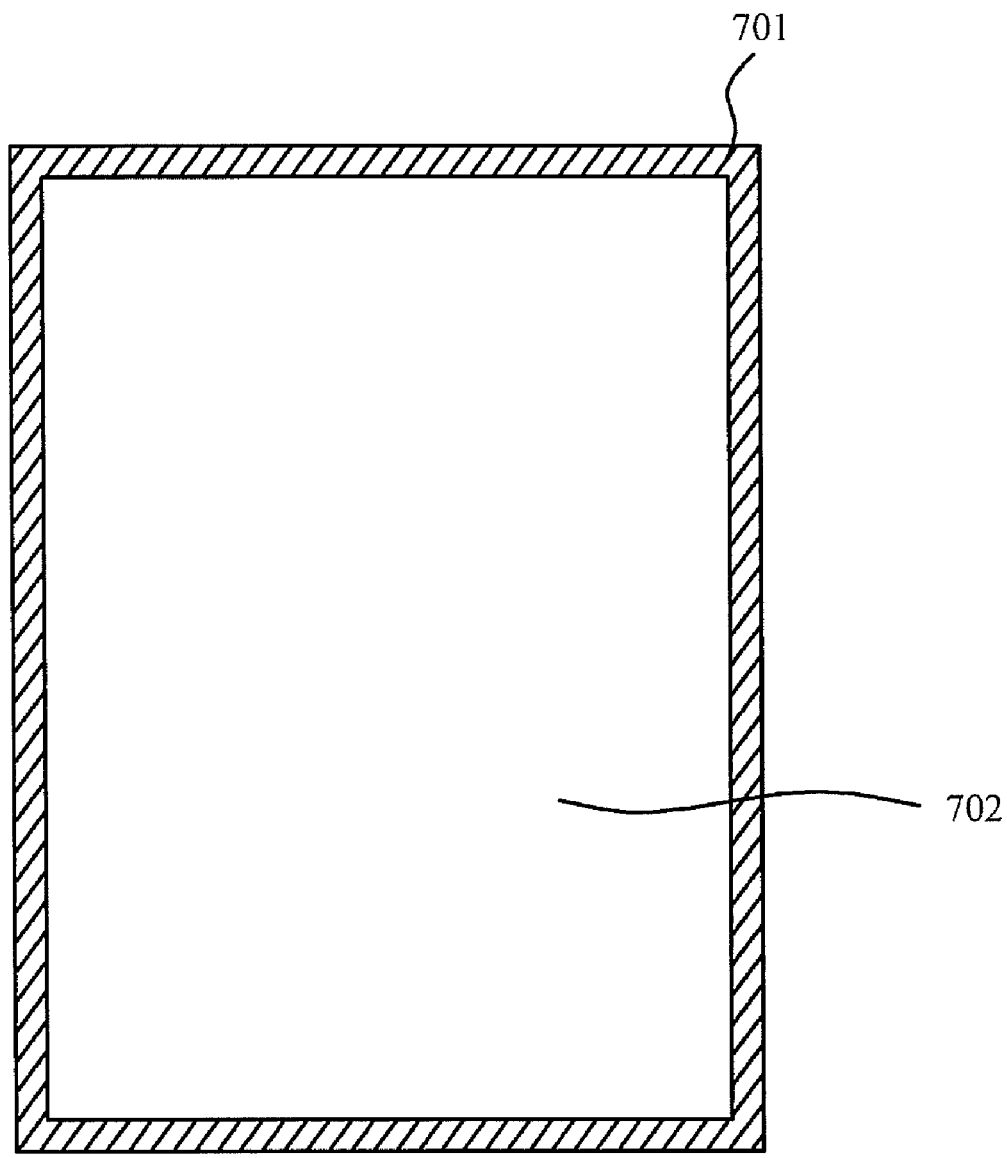
FIG. 4 is a schematic illustration showing the mismatch between the coordinate arrangements of the capacitive touch pad and the display.

The coordinate obtained hereinabove has to be transferred so that the coordinate of the display module 40 can be obtained. However, because the electronic device is getting more and more miniaturized recently, the side frame of the handheld mobile device is getting smaller and smaller. Thus, the capacitive sensor 41 and the display region of the display module 40 must have the same size. However, each of the sensing lines X01 to X12 of the capacitive sensor 41 has a predetermined line width. FIG. 4 is a schematic illustration showing the mismatch between the coordinate arrangements of the capacitive touch pad and the display. Referring to FIG. 4, when the finger touches the first X-axis sensing electrode X01 of the capacitive sensor 41, the obtained coordinate is 0. However, the sensing electrode X01 is separated from the edge of the screen by a predetermined distance. In this case, if the finger points to an edge portion 701 of the display module 40, the coordinate of the display module 40 cannot be obtained by transferring the coordinate of the capacitive sensor 41. Furthermore, if the center point of the first X-axis sensing line X01 is forced to be arranged on the edge of the display module 40, the user may unintentionally touch the first X-axis sensing electrode X01 of the capacitive sensor 41 when the user touches the side frame of the product. Then, the sensing of the capacitive sensor 41 may have problems in the future.

In order to solve the above-mentioned problems, the invention provides a method of calibrating coordinates of the display panel and the capacitive sensor. The method is applied to two regions. The first region is a linear region, which is a middle region 702 of the display module 40, while the second region is a non-linear region, which is the edge portion 701 of the display module 40. The coordinate transferring methods of the two regions will be described in the following. Before the method of this embodiment is described, it is assumed that the resolution of the display module 40 is 240×320, which means that 240 pixels appear on the X-axis.

Figure 5:
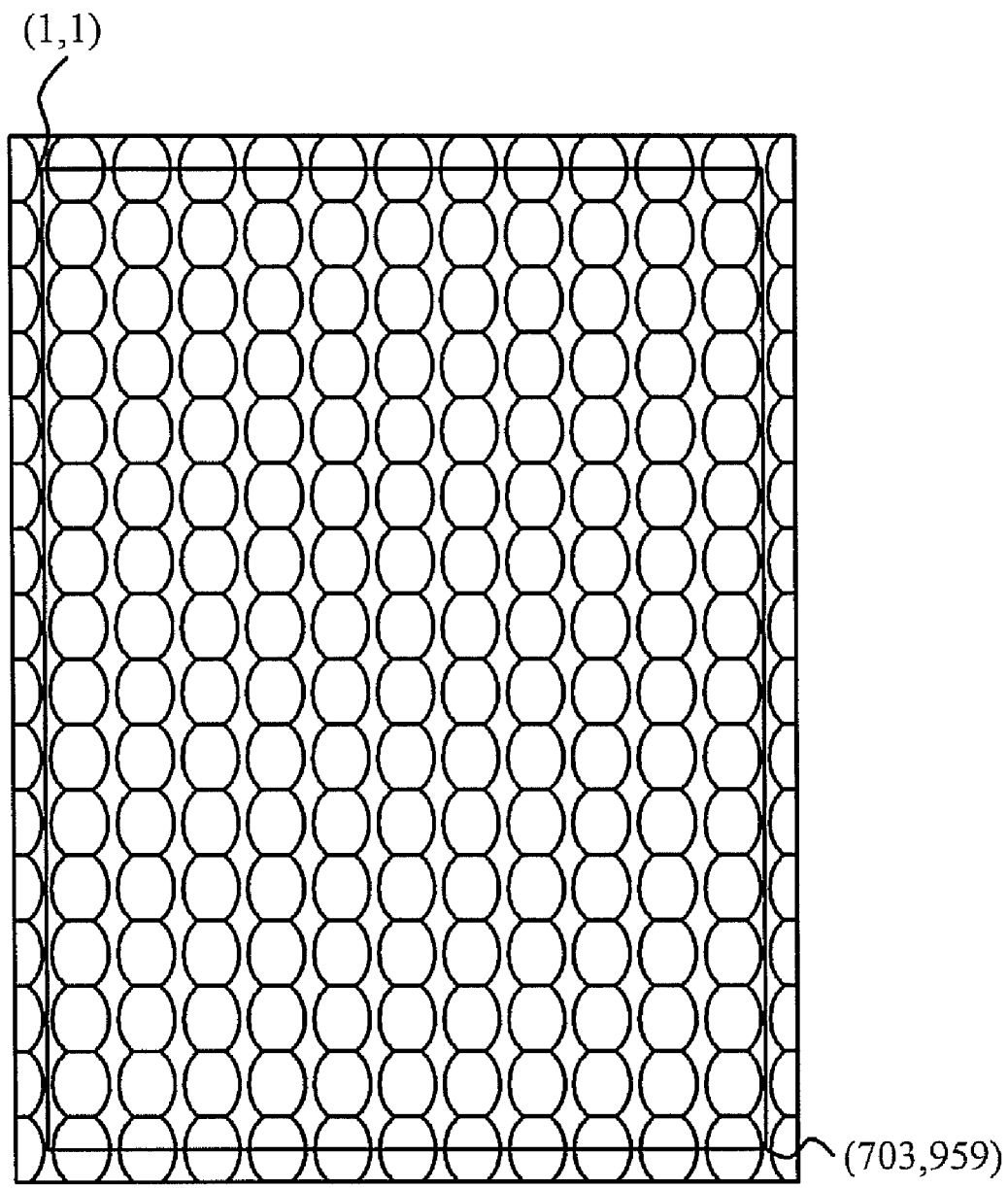
FIG. 5 is a schematic illustration showing a linear region of a non-differential sensing type capacitive sensor according to the embodiment of the invention.
Figure 6:
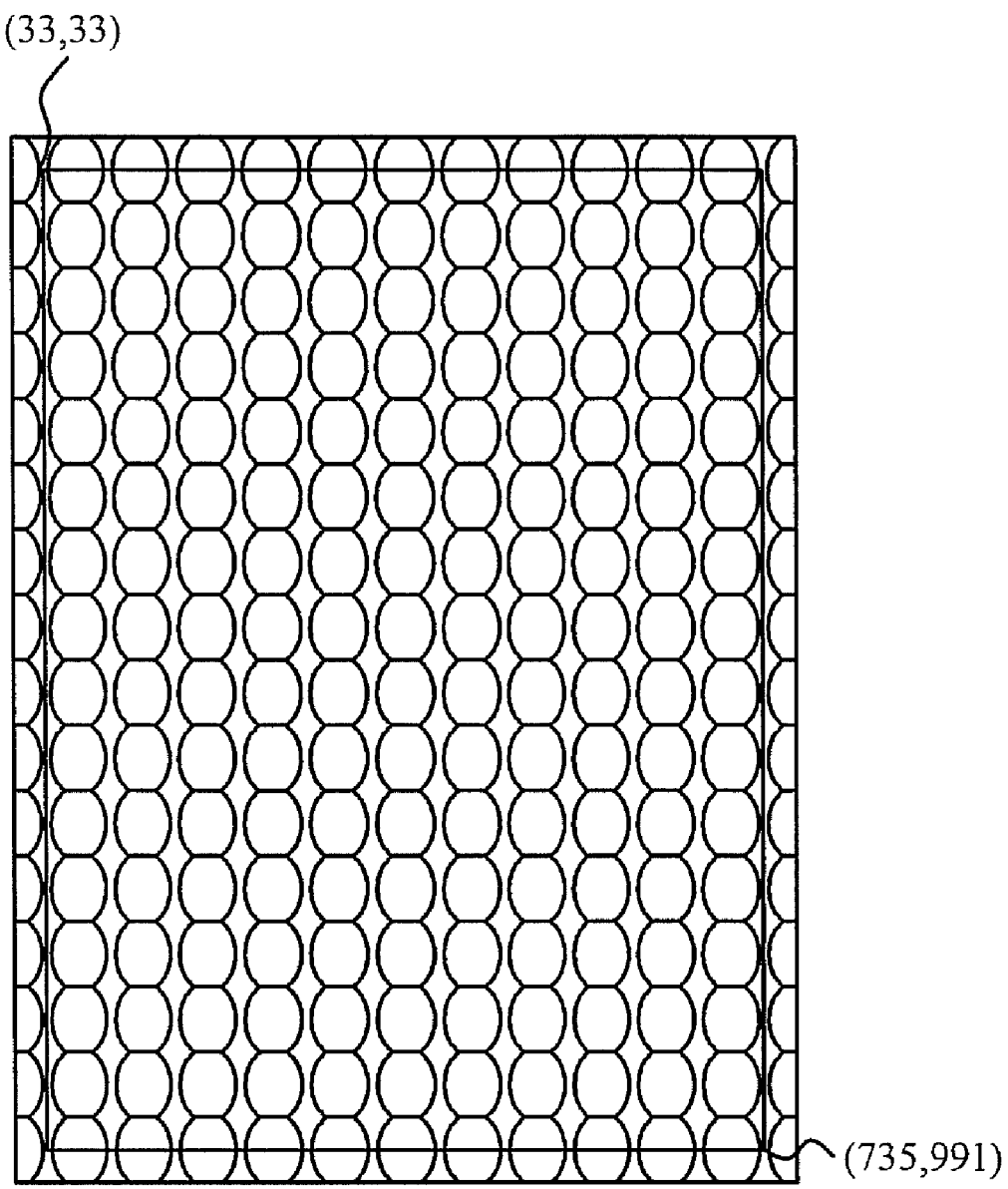
FIG. 6 is a schematic illustration showing the coordinate shift of the non-differential sensing type capacitive sensor according to the embodiment of the invention.

First, the method of transferring the coordinate in the linear region will be described. FIG. 5 is a schematic illustration showing a linear region of a non-differential sensing type capacitive sensor according to the embodiment of the invention. Referring to FIG. 5, the linear region represents the region in which the coordinate may be determined by the capacitive sensor 41. Herein, it is assumed that the capacitive sensor 41 is the non-differential sensing type capacitive sensor, 12 sensing lines appear on the X-axis, 16 sensing lines appear on the Y-axis, and a portion between each sensing line and its adjacent sensing line may be divided into 64 coordinate positions. Thus, the coordinates (1,1) to (703,959) may be obtained in this linear region. If the upper left corner of the sensor is to be positioned as a coordinate original point, the coordinates of the linear region have to be shifted. FIG. 6 is a schematic illustration showing the coordinate shift of the non-differential sensing type capacitive sensor according to the embodiment of the invention. Referring to FIG. 6, the coordinates of the start point of the linear region are (33,33), and the coordinates of the end point of the linear region are (735,991) after the coordinates of the linear region are shifted.

Because the portion between any two adjacent X-axis sensing electrodes may be divided into 64 coordinate positions, the coordinate of the capacitive sensor in the middle position of the first X-axis sensing line X01 has to be shifted by 32, and the coordinate of the capacitive sensor in the middle position of the twelfth X-axis sensing electrode X12 has to be shifted by 704+32=736. Assume that the finger presses the capacitive sensor 41 as shown in FIG. 6A, the obtained X coordinate on the capacitive sensor 41 is 369.76. Next, a sum of the coordinate and 32 is obtained, and then the sum is divided by theoretical total coordinates (64*12=768) of the capacitive sensor and then multiplied by the X-axis resolution (240) to obtain the X coordinate of the display module 40 on which the finger presses. The mathematically expression is listed as follows:

$X$ coordinate=(369.76+32)×240÷768=133.9875≈134
(divided by 768 and then multiplied by 240).

It is understood, from the above-mentioned embodiment, that the invention obtains a first coordinate by adding a coordinate of a touch object, which is calculated in the linear region, to a calibrating value. The above-mentioned "shift" makes the coordinate original point of the capacitive sensor overlap with the coordinate original point of the display. The first coordinate is multiplied by a ratio and is thus transferred into a second coordinate of the touch object on the display panel.

Figure 7A:
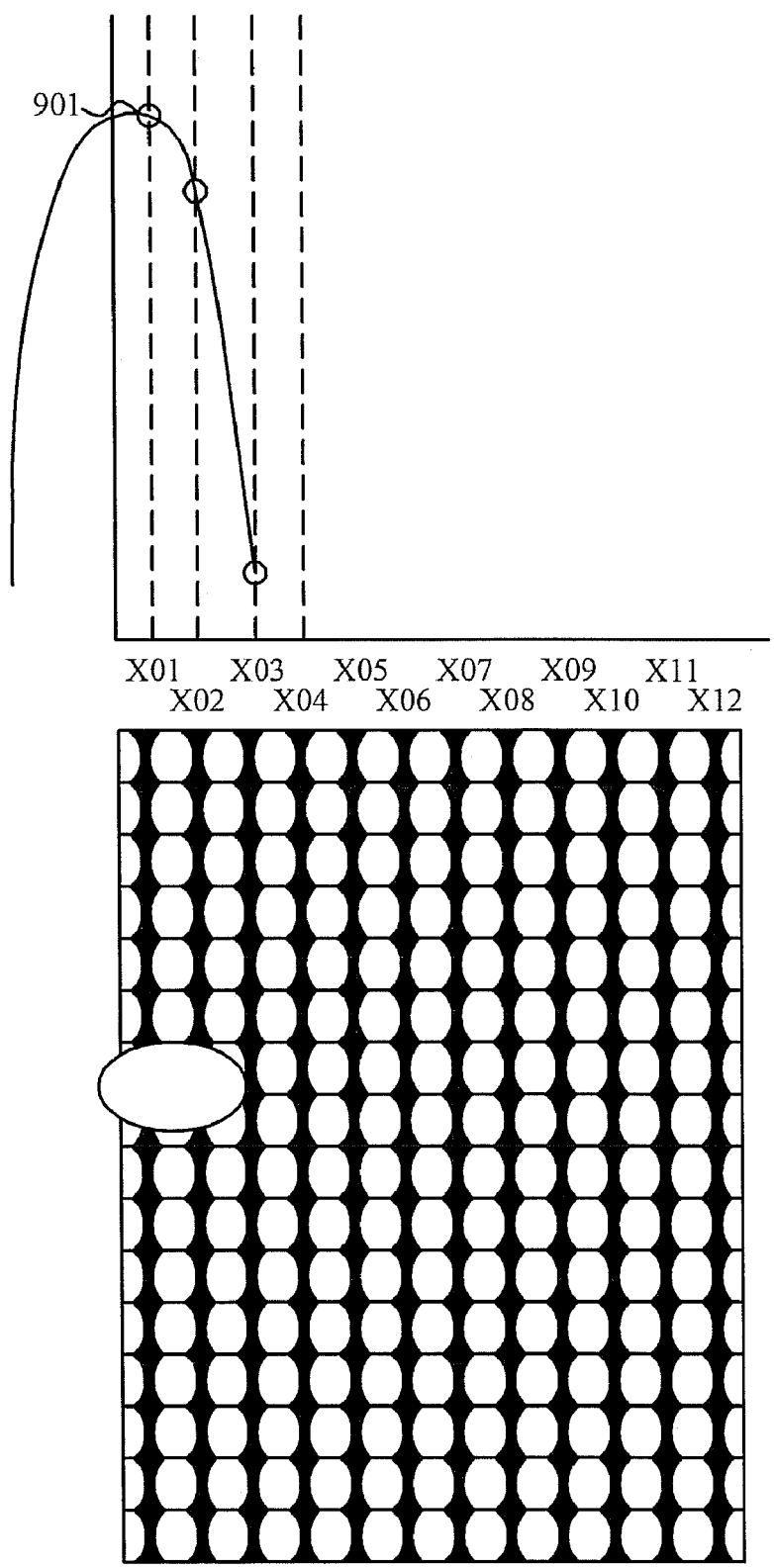
FIGS. 7A to 7C are schematic illustrations showing contrast relationships of the corresponding digital values obtained when a conductor presses an X-axis sensing line on the capacitive sensor 41.
Figure 7B:
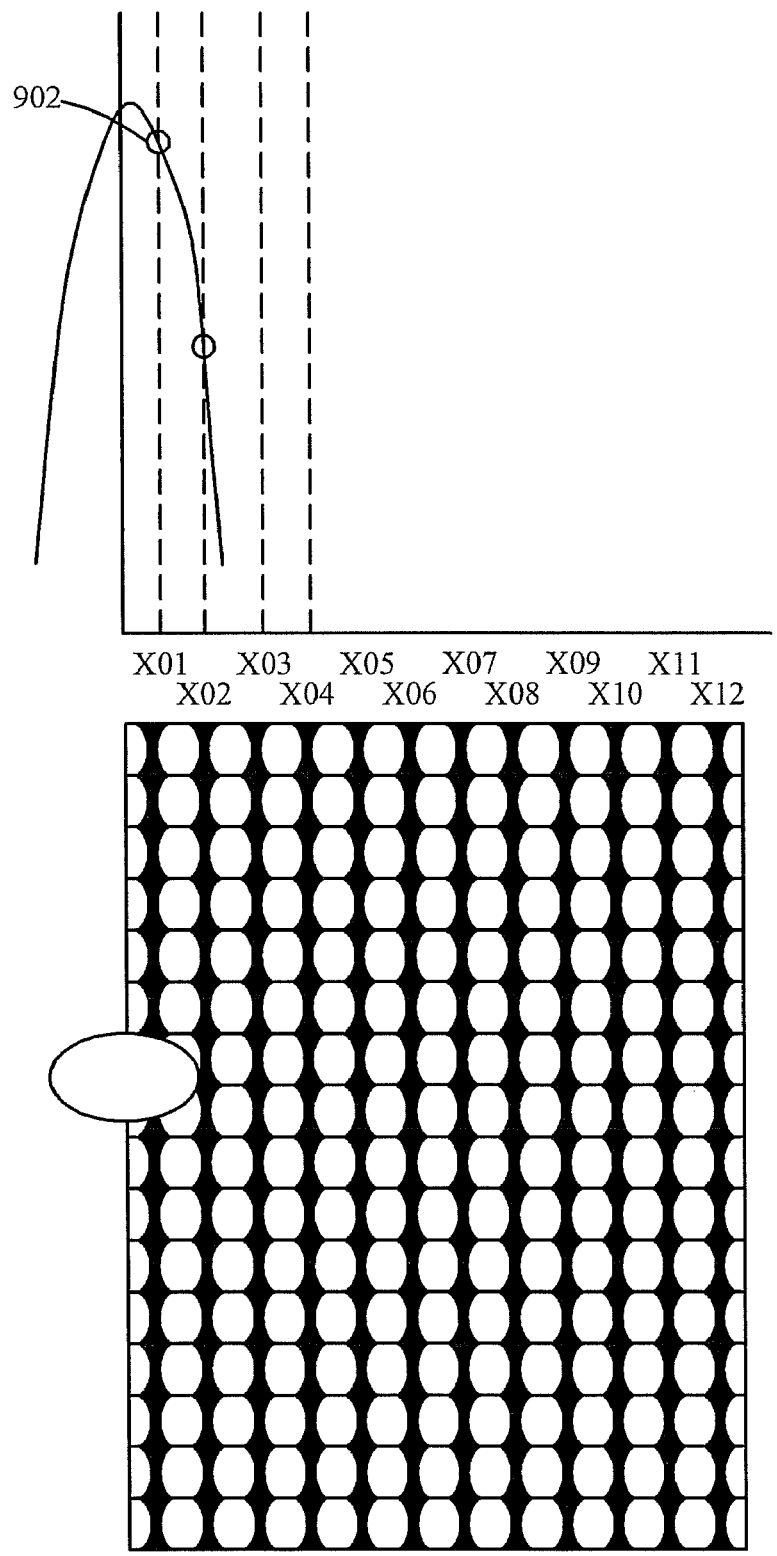
Figure 7C:
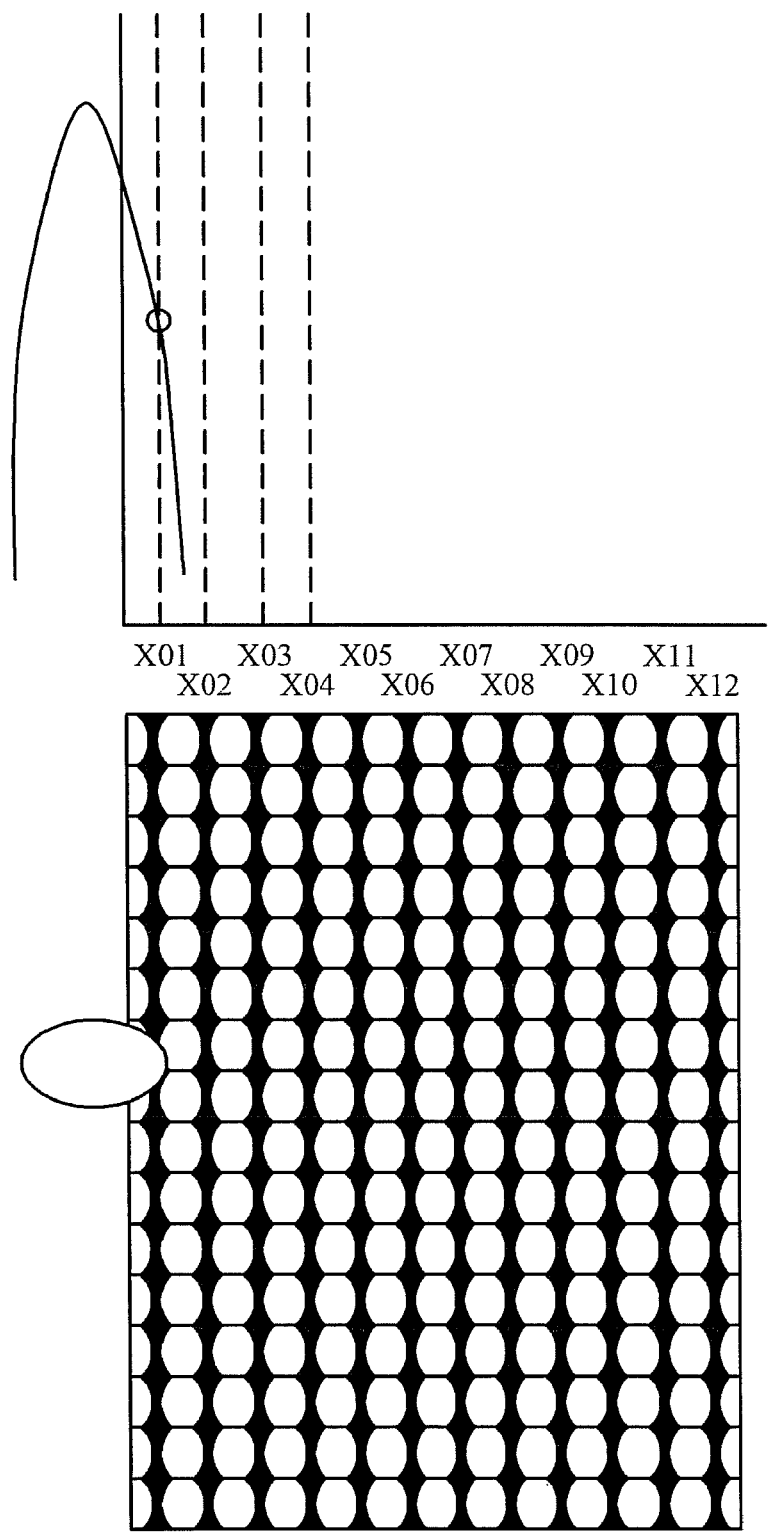

Next, the method of transferring the coordinates in the non-linear region will be explained. FIGS. 7A to 7C are schematic illustrations showing contrast relationships of the corresponding digital values obtained when a conductor presses an X-axis sensing line on the capacitive sensor 41. As shown in FIGS. 7A and 7B, when the conductor, which is typically a finger, presses the sensing line X01 with the larger contact surface area, the equivalent capacitance of the sensing line X01 gets larger. Correspondingly, the obtained digital value also becomes larger. Therefore, it is determined that the X coordinate falls at which point among 0 to 31 according to the digital value corresponding to the first X-axis sensing electrode X01 in this embodiment.

As shown in FIG. 7C, when the finger presses the first X-axis sensing line X01 of the capacitive sensor 41, only the digital value corresponding to the sensing line X01 is obtained. Herein, a reference value is set in advance. For the sake of illustration, the reference value is assumed to be 160. That is, when only the digital value corresponding to the sensing electrode X01 is obtained and the value is greater than or equal to 160, it is determined that the X coordinate falls at 32. When only the digital value corresponding to the sensing electrode X01 is obtained and the value is equal to 80, it is determined that the X coordinate falls at 15. Simply speaking, the X coordinate is determined according to the ratio relationship between the digital value, corresponding to the sensing electrode X01, and the reference value. The determining method may be listed in the following table.

| Digital value corresponding to sensing electrode X01 | Determined X coordinate |
| --- | --- |
| 0-5 | 0 |
| 6-10 | 1 |
| 11-15 | 2 |
| 16-20 | 3 |
| 21-25 | 4 |
| 26-30 | 5 |
| 31-35 | 6 |
| 36-40 | 7 |
| 41-45 | 8 |
| 46-50 | 9 |
| 51-55 | 10 |
| 56-60 | 11 |
| 61-65 | 12 |
| 66-70 | 13 |
| 71-75 | 14 |
| 76-80 | 15 |
| 81-85 | 16 |

| Digital value corresponding to sensing electrode X01 | Determined X coordinate |
|---|---|
| 86-90 | 17 |
| 91-95 | 18 |
| 96-100 | 19 |
| 101-105 | 20 |
| 106-110 | 21 |
| 111-115 | 22 |
| 116-120 | 23 |
| 121-125 | 24 |
| 126-130 | 25 |
| 131-135 | 26 |
| 136-140 | 27 |
| 141-145 | 28 |
| 146-150 | 29 |
| 151-155 | 30 |
| 156-159 | 31 |
| greater than or equal to 160 | 32 |

Assume the obtained X coordinate is 20. The X coordinate on the screen may be obtained by the calculation according to the ratio:

$X$ coordinate=20×240÷768=6.25≈6 (divided by 768 and then multiplied by 240).

It is understood, from the above-mentioned embodiment, that the coordinate original points of the non-linear region and the display region overlap with each other. The invention obtains a third coordinate of the touch object on the capacitive sensor according to a look-up table. The third coordinate is multiplied by a ratio so that the third coordinate is transferred into a fourth coordinate of the touch object on the display panel.

Although the embodiment only calculates the X-axis coordinate, one of ordinary skill in the art may easily understand that the Y-axis coordinate may also be calculated in a manner similar to that of the above-mentioned embodiment. So, detailed descriptions thereof will be omitted.

Figure 8:
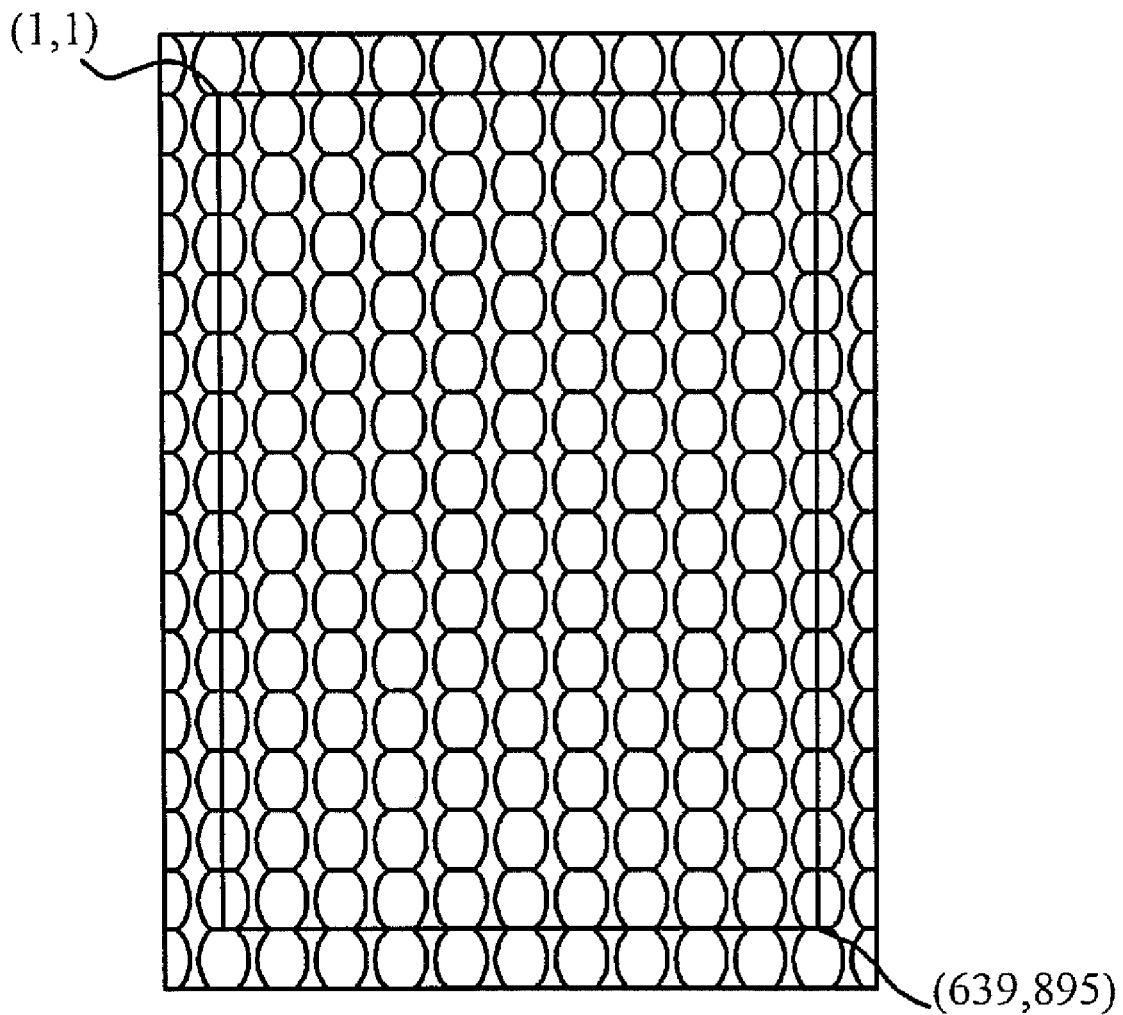
FIG. 8 is a schematic illustration showing a linear region of a differential sensing type capacitive sensor according to the embodiment o the invention.
Figure 9:
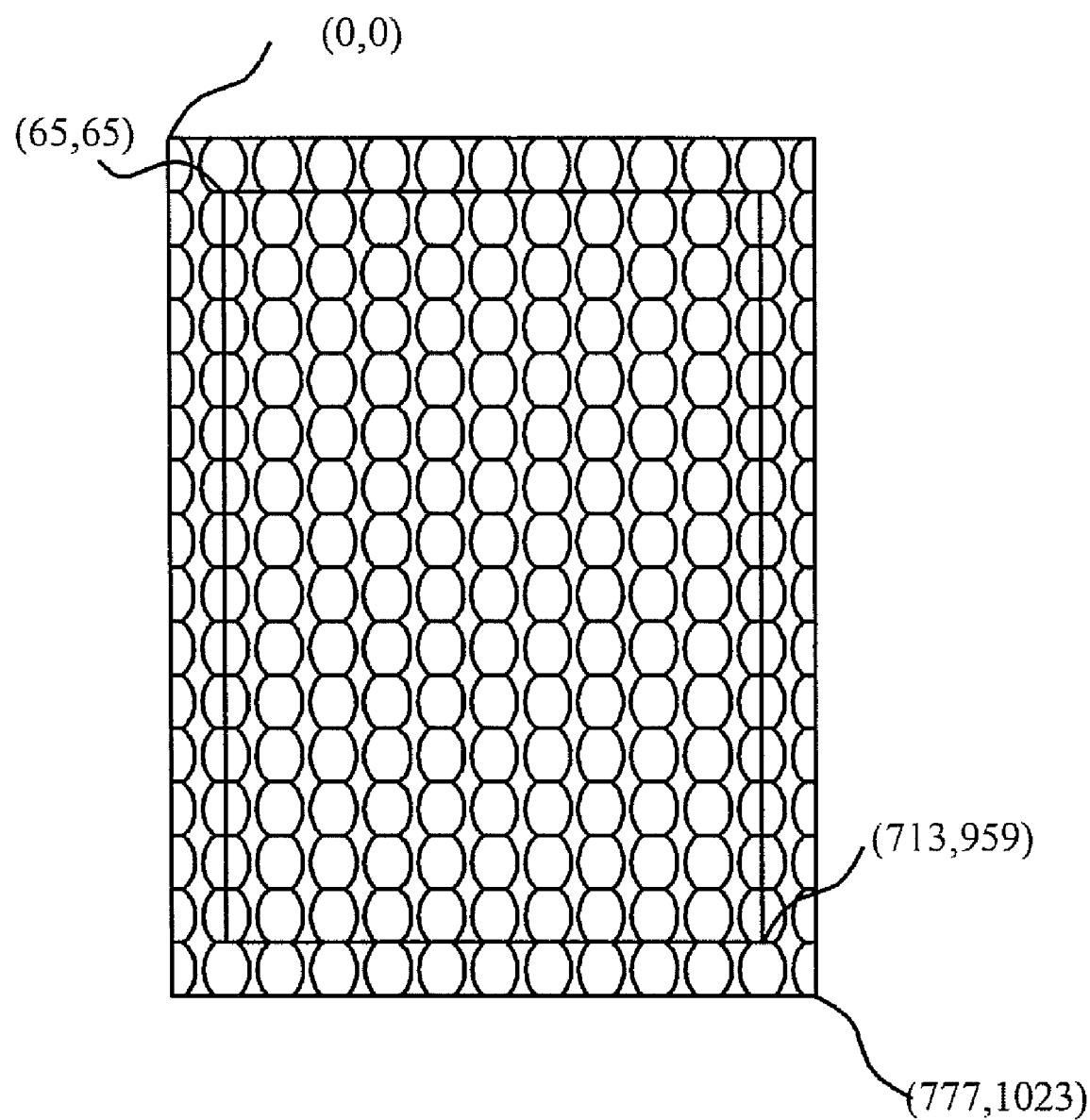
FIG. 9 is a schematic illustration showing the coordinate shift of the differential sensing type capacitive sensor according to the embodiment of the invention.

Next, when the capacitive sensor 41 is the differential sensing type capacitive sensor, it represents that only one digital value can be obtained between every two sensing electrodes. FIG. 8 is a schematic illustration showing a linear region of a differential sensing type capacitive sensor according to the embodiment o the invention. It is assumed that 12 X-axis sensing lines are provided, 16 Y-axis sensing lines are provided, and the portion between two adjacent sensing lines may be divided into 64 coordinate positions. Because only one digital value can be obtained between every two sensing lines, the coordinates of the linear region before being shifted only range from (1,1) to (639,895). FIG. 9 is a schematic illustration showing the coordinate shift of the differential sensing type capacitive sensor according to the embodiment of the invention. As shown in FIG. 9, the shifted coordinates range from (65,65) to (713,959). The X coordinates of the non-linear region after being shifted range from 0 to 64, and from 714 to 778.

First, the method of transferring the coordinates of the linear region will be explained. Similarly, it is assumed that the control circuit C10 judges that the X coordinate is 369.76. When the coordinate has to be transferred into the X coordinate on the display module 40, only the following calculation has to be performed to obtain the X coordinate of the display module 40, which is equal to 136:

(369.76÷64)×240÷768=135.55≈136 (divided by 768 and then multiplied by 240).

Similarly, when the finger is in the non-linear region, for example, when the finger touches a left edge of the capacitive sensor 41, the control circuit C10 only obtains the digital values corresponding to the sensing electrodes X01 and X02. At this time, a default value is preset similarly. Assume the default value is 192. Simply speaking, the X coordinate is determined according to the ratio relationship between the digital values, corresponding to the sensing electrodes X01 and X02, and the reference value. When the digital values corresponding to the obtained sensing electrodes X01 and X02 range from 94 to 96, it is determined that the X coordinate falls at 31. Thereafter, the obtained coordinate may be transferred into the X coordinate on the screen only according to the ratio relationship:

the $X$ coordinate on the screen=31× 240÷768=9.6875≈10. (divided by 768 and then multiplied by 240).

Figure 10:
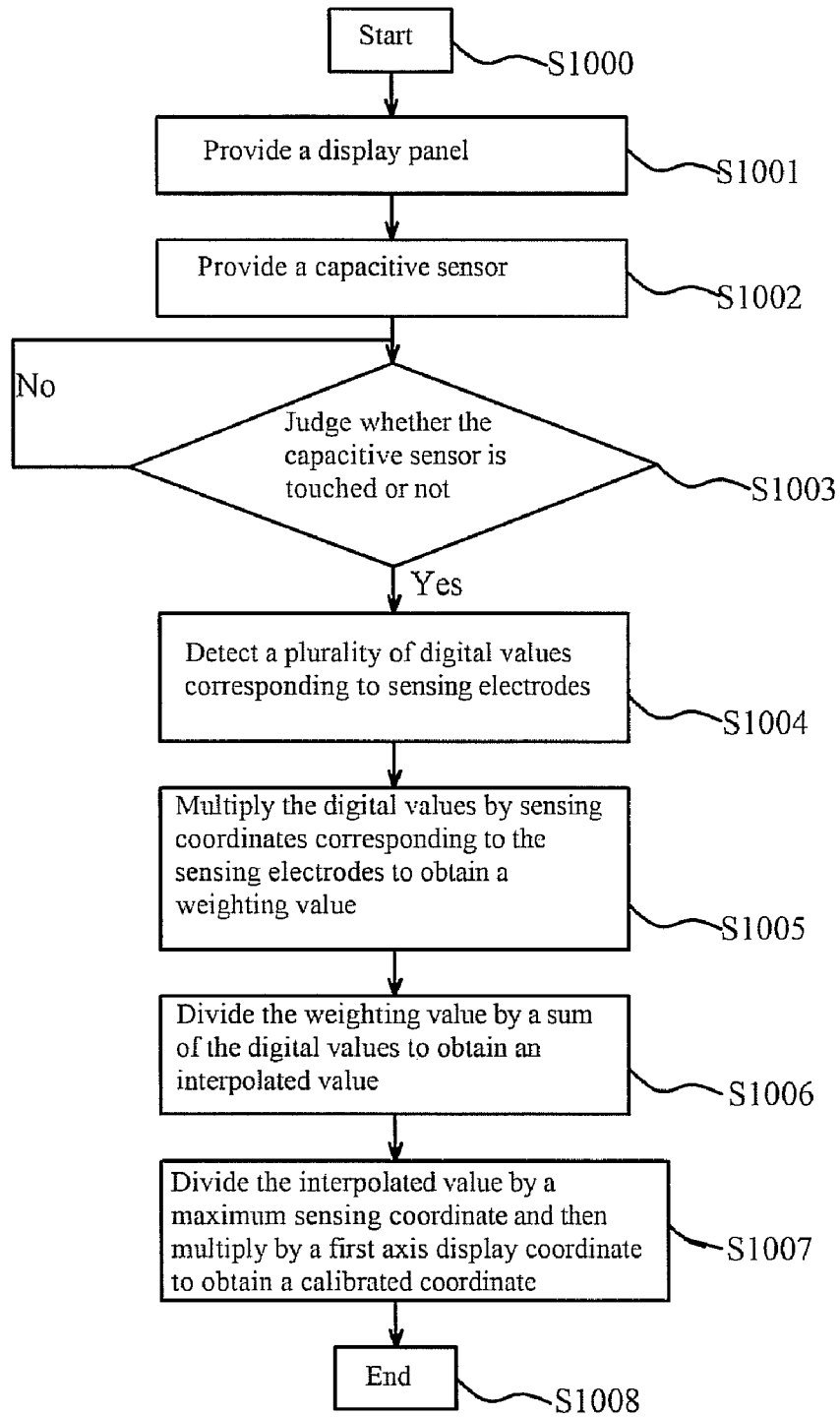
FIG. 10 is a flow chart showing a method for calibrating coordinates of the touch screen according to the embodiment of the invention.
Figure 11A:
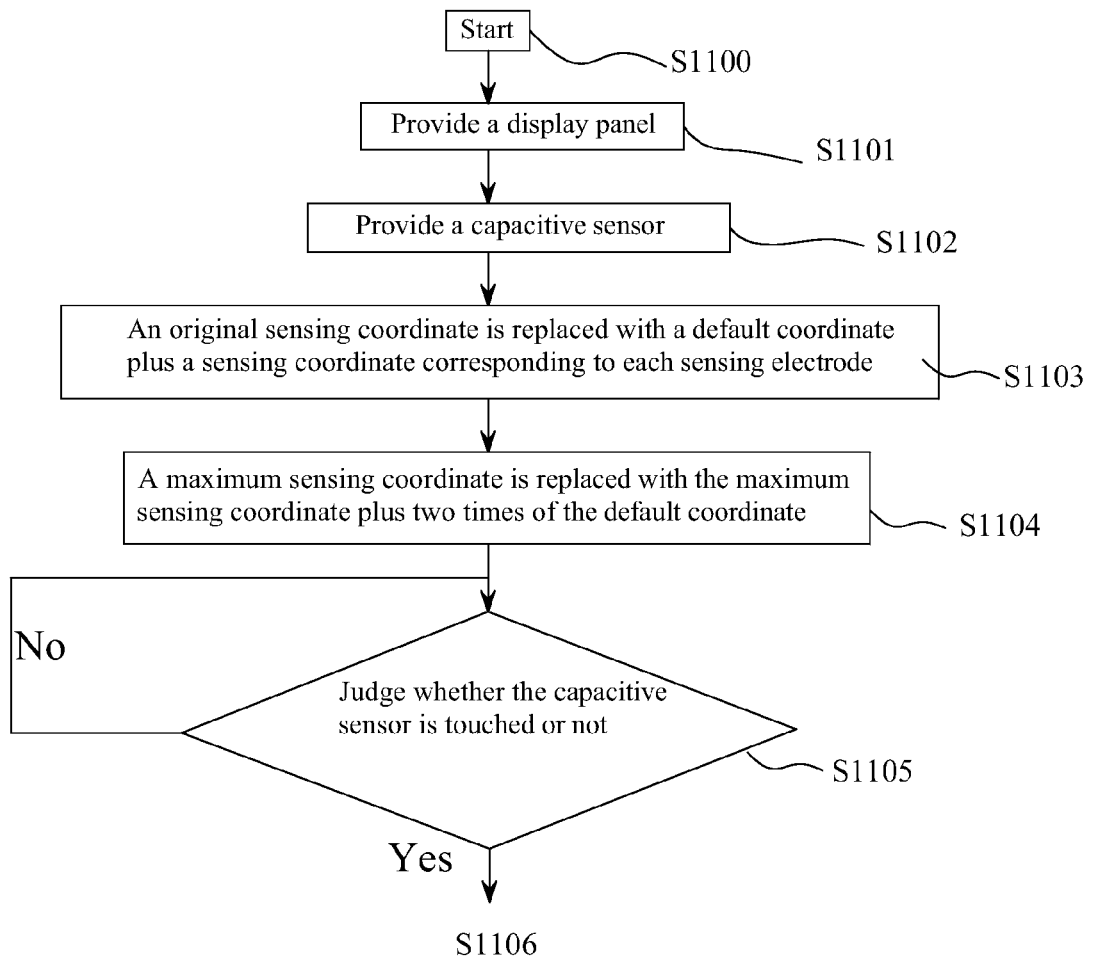
FIGS. 11A-D are flow charts showing another method for calibrating coordinates of the touch screen according to the embodiment of the invention.
Figure 11B:
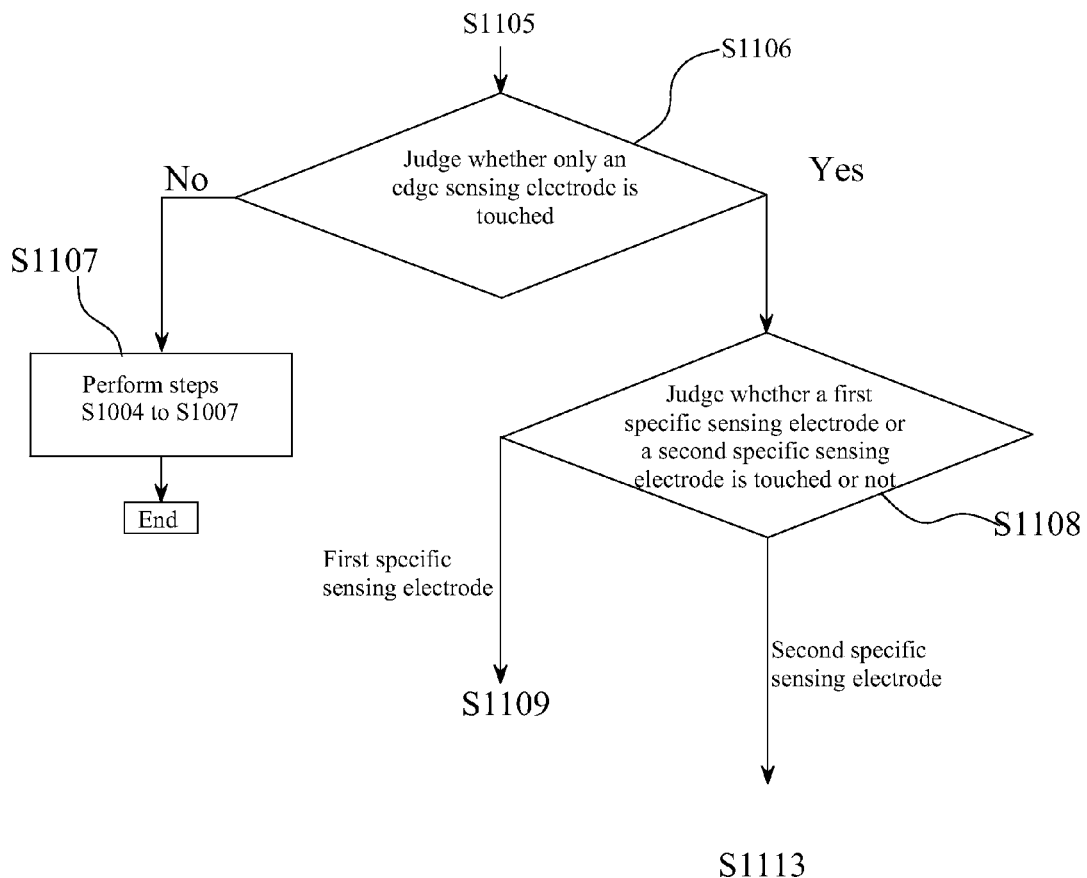
Figure 11C:
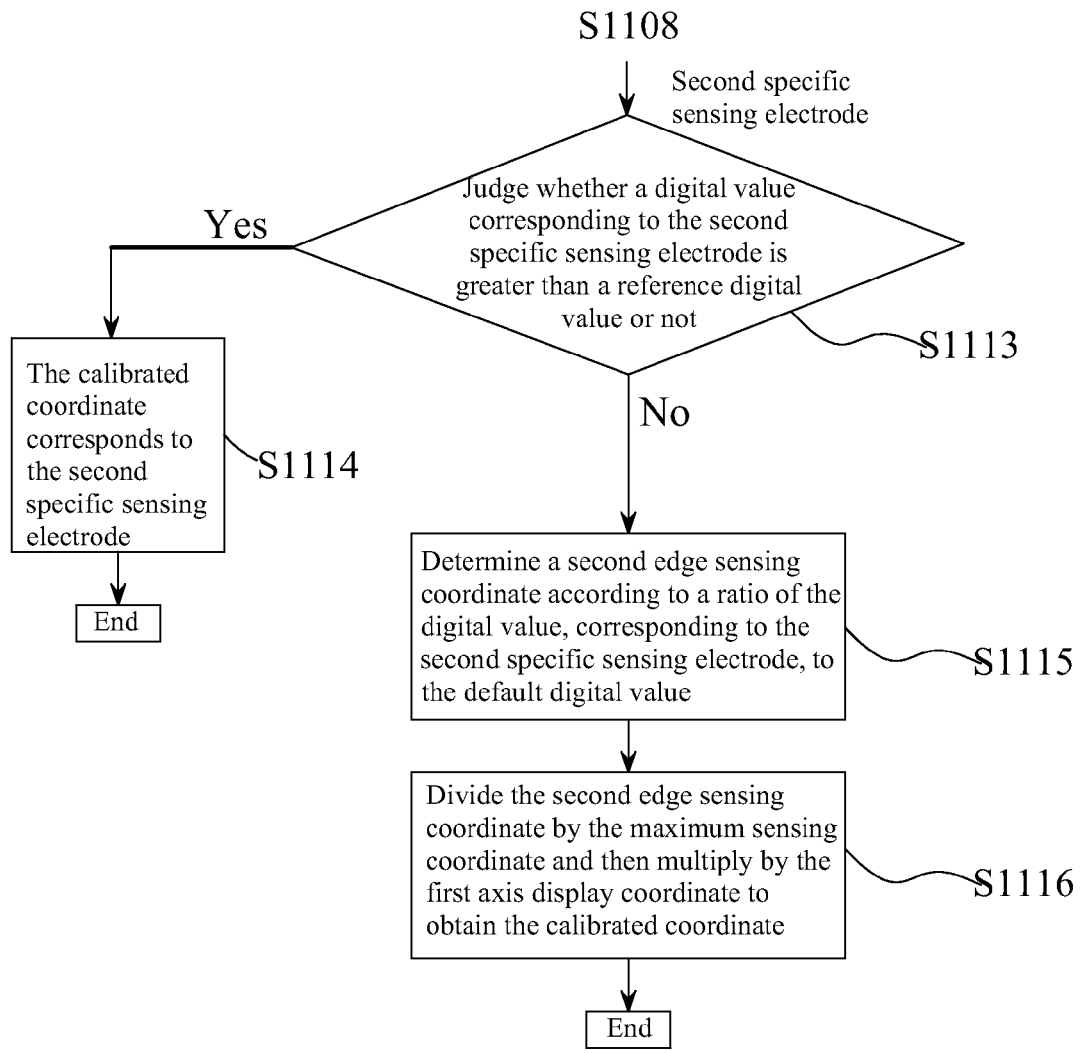
Figure 11D:
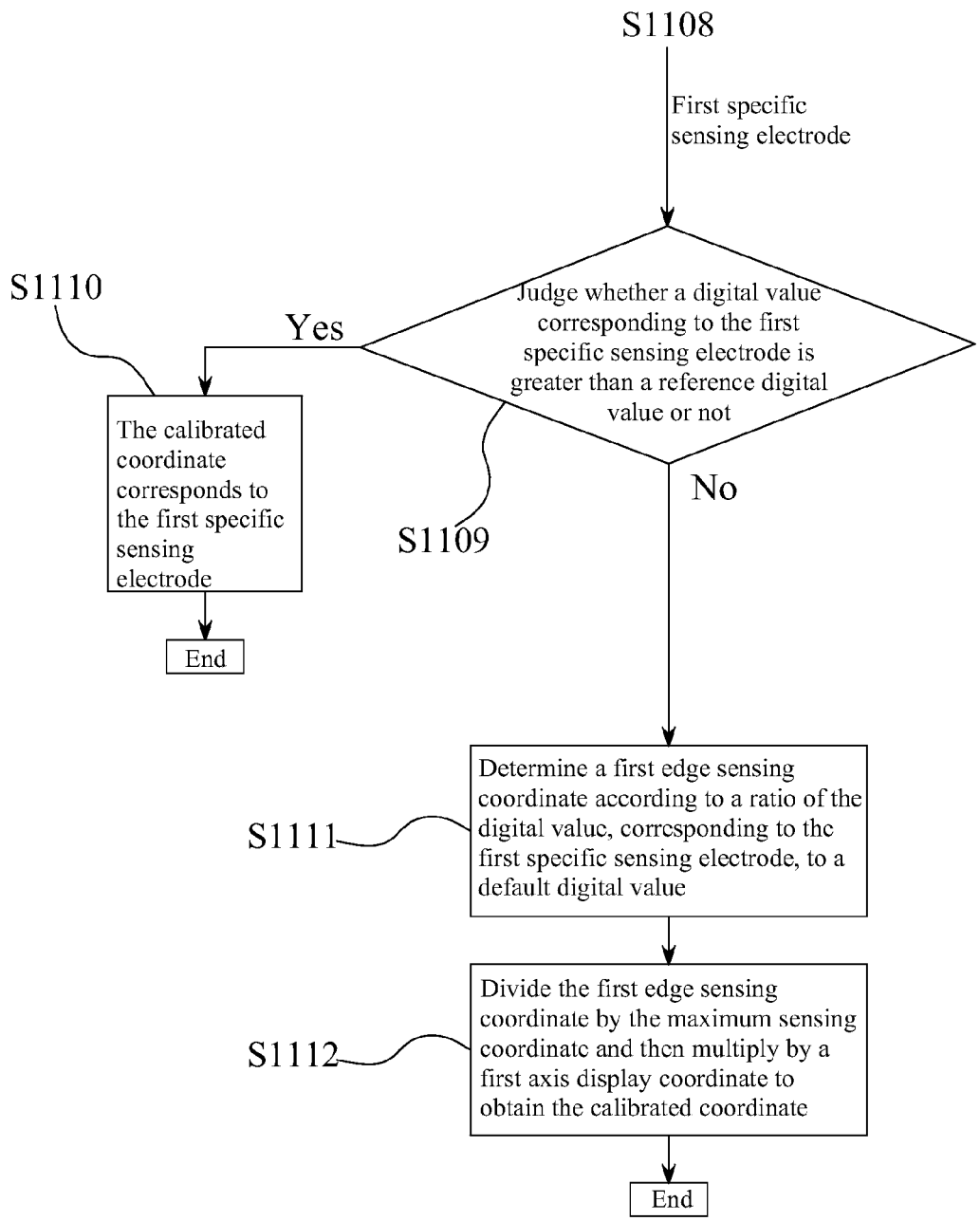

According to the above-mentioned embodiment, the two methods for calibrating the coordinates may be concluded. FIGS. 10 and 11A, 11B. and 11C are flow charts showing methods for calibrating coordinates of the touch screen according to the embodiment of the invention. Referring to FIG. 10, in which the linear region and the display region are assumed to overlap with each other, the method includes the following steps.

In step S1000, the procedure starts.

In step S1001, a display panel is provided. The display panel includes a plurality of display coordinates along a first axis, and a first axis display coordinate. For example, the display module 40 has the resolution of 240×320, which means that 240 pixels (i.e., coordinates) appear on the X-axis, and the maximum display coordinate is 239.

In step S1002, a capacitive sensor is provided. The capacitive sensor includes a plurality of sensing electrodes disposed along the first axis and respectively corresponding to a plurality of sensing coordinates. The capacitive sensor has a maximum sensing coordinate. For example, the above-mentioned capacitive sensor 41, such as the non-differential sensing type capacitive sensor, has 12 sensing electrodes X01 to X12, wherein X01 corresponds to the coordinate of 0, X02 corresponds to the coordinate of 64, . . . , and X12 corresponds to the coordinate of 704. The maximum display coordinate is 704.

In step S1003, it is judged whether the capacitive sensor is touched or not. If not, the procedure goes back to the step S1003 to continue detection. If yes, step S1004 is performed.

In the step S1004, a plurality of digital values corresponding to the sensing electrodes is detected. As shown in FIG. 3A, when the conductor, such as the finger, touches the sensing electrodes X6 to X8 on the capacitive sensor, the digital value corresponding to X6 is 163, the digital value corresponding to X7 is 185, and the digital value corresponding to X8 is 70.

In step S1005, the digital values are multiplied by the sensing coordinates corresponding to the sensing electrodes to obtain a weighting value. Next, the digital value (163) is multiplied by 5 and 64; the digital value (185) is multiplied by 6 and 64; and the digital value (70) is multiplied by 7 and 64. Thus, the weighting value of 154560 is obtained by summing up the three products (163*5*64+185*6*64+70*7*64).

In step S1006, the weighting value is divided by the sum of the digital values to obtain an interpolated value. That is, the weighting value (154560) is divided by (163+185+70) to obtain the interpolated value, which is equal to 369.76 and corresponds to the coordinate of the conductor touching the capacitive sensor.

In step S1007, the interpolated value is divided by the maximum sensing coordinate and then multiplied by the first axis display coordinate to obtain a calibrated coordinate.

In step S1008, the procedure ends.

Of course, this example only can be applied to the condition when the display panel is located in the linear region of the capacitive sensor. When the edges of the capacitive sensor and the display region are arranged close to each other, the method according to the embodiment of the invention includes the following steps.

In step S1100, the procedure starts.

In step S1101, the display panel of the step S1001 is provided.

In step S1102, a capacitive sensor is provided. The capacitive sensor includes a plurality of sensing electrodes disposed along a first axis and respectively corresponding to a plurality of sensing coordinates. The capacitive sensor has a maximum sensing coordinate. The coordinate corresponding to a first specific sensing electrode, which is nearest to a first edge of the capacitive sensor, is an initial value. The coordinate corresponding to a second specific sensing electrode, which is nearest to a second edge of the capacitive sensor, is the same as the maximum sensing coordinate.

In step S1103, a sum of the sensing coordinate, corresponding to each sensing electrode, and a default coordinate is obtained to replace the original sensing coordinate. It is understood, from the above-mentioned embodiment, that the sensing electrode has a predetermined width. In addition, 64 sensing coordinates appear between two adjacent sensing electrodes. So, 32 sensing coordinates appear in the portion between the edge and the center of the sensing electrode, which is nearest to the edge. So, the default coordinate (32) and the sensing coordinate corresponding to each sensing electrode are summed to replace the original sensing coordinate in this embodiment.

In step S1104, the maximum sensing coordinate and two times of the default coordinate are summed to replace the maximum sensing coordinate. Similarly, the original maximum coordinate and 64 are summed up to replace the original maximum sensing coordinate.

In step S1105, it is judged whether the capacitive sensor is touched or not. If not, the procedure goes back to step S1106 to continue the judgement. If yes, the procedure goes to step S1107.

In step S1106, it is judged whether only the edge sensing electrode is touched or not. If not, the procedure goes to step S1108. If yes, the procedure goes to step S1109.

In the step S1107, the steps S1004 to S1007 are performed to obtain the calibrated coordinate. Taking the embodiment of FIG. 3A as an example, the above-mentioned steps may be concluded as summing up the interpolated value (369.76) and 32 to obtain a sum, multiplying the sum by the maximum X coordinate (240) of the display panel to obtain a product, and then dividing the product by the calibrated maximum coordinate (768) of the capacitive sensor. Thus calibrated X-axis coordinate of 134 mentioned hereinabove may be obtained.

In step S1108, it is judged whether the first edge or the second edge is touched or not. In this embodiment, the first edge is the edge which is nearest to the X-axis coordinate (0) of the display panel; and the second edge is the edge which is nearest to the X-axis coordinate (239) of the display panel. When the first edge is touched, step S1110 is performed; when the second edge is touched, step S1114 is performed.

In step S1109, it is judged whether the digital value corresponding to the first specific sensing electrode is greater than a reference digital value or not. As mentioned hereinabove, the equivalent capacitance of the sensing line X01 gets larger and the obtained digital value also gets larger as the contact surface area between the finger and the sensing line X01 becomes larger. Thus, the value of 160 is preset as the reference digital value in this embodiment. This value is usually set according to the experimental result or the engineer's experience.

In the step S1110, when the judgement result is yes, it is determined that the calibrated coordinate is the coordinate corresponding to the first specific sensing electrode. In the above-mentioned embodiment, when the digital value is greater than 160, the determined coordinate is 32.

In the step S1111, when the digital value corresponding to the first specific sensing electrode is smaller than the reference digital value, a first edge sensing coordinate is determined according to a ratio of the digital value, corresponding to the first specific sensing electrode, to the default digital value. It is understood, from the above-mentioned embodiment, that the equivalent capacitance of the sensing line X01 becomes larger and the digital value also correspondingly becomes larger as the contact surface area between the finger and the sensing line X01 gets larger. Therefore, as long as the digital value corresponding to the first specific sensing electrode is obtained, the first edge sensing coordinate can be obtained according to the ratio relationship between the digital value and the default digital value (160), such as the above-mentioned look-up table. Generally speaking, the ratio relationship is created on the look-up table. Of course, one of ordinary skill in the art may easily implement this step according to the build-in mathematical expression or the software.

In step S1112, the first edge sensing coordinate is divided by the maximum sensing coordinate and then multiplied by the first axis display coordinate to obtain the calibrated coordinate.

In step S1113, it is judged whether the digital value corresponding to the second specific sensing electrode is greater than the reference digital value. Similarly, when it is detected that the second specific sensing electrode nearest to the second edge is touched, it is judged whether its corresponding digital value is greater than the reference digital value or not.

In step S1114, when the judged result is yes, it is judged that the calibrated coordinate is the coordinate corresponding to the second specific sensing electrode. As mentioned in the embodiment, when the digital value is greater than 160, the determined coordinate is 736.

In step S1115, when the digital value corresponding to the second specific sensing electrode is smaller than the reference digital value, a second edge sensing coordinate is determined according to the ratio of the digital value, corresponding to the second specific sensing electrode, to the default digital value. The second edge sensing coordinate ranges between the maximum sensing coordinate and the sensing coordinate corresponding to the first specific sensing electrode.

In step S1116, the second edge sensing coordinate is divided by the maximum sensing coordinate and then multiplied by the first axis display coordinate to obtain the calibrated coordinate.

One aspect of the invention is to calibrate the coordinate mismatch between the capacitive sensor and the display panel by way of interpolation. On the other hand, because the capacitive sensor has a plurality of sensing electrodes each having a predetermined width, only the coordinate corresponding to the edge sensing electrode can be calculated by way of interpolation when only the edge sensing electrode is touched. Thus, the edge of the display panel cannot be touched. Therefore, another aspect of the invention is to determine the coordinate of the edge according to the digital value corresponding to the equivalent capacitance sensed by the edge sensing electrode. Thus, the problem of mismatch between the coordinate arrangements of the capacitive touch pad and the display can be solved.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A method for calibrating coordinates of a touch screen, the method comprising the steps of:
   providing a display panel, which comprises a plurality of display coordinates along a first axis, wherein the display coordinates comprise a first axis display coordinate;
   providing a capacitive sensor, which comprises a plurality of sensing electrodes disposed along the first axis and respectively corresponding to a plurality of sensing coordinates, wherein the capacitive sensor has a maximum sensing coordinate;
   detecting a plurality of digital values corresponding to the sensing electrodes when the capacitive sensor is touched;
   multiplying the digital values by the sensing coordinates corresponding to the sensing electrodes to obtain a weighting value;
   dividing the weighting value by a sum of the digital values to obtain an interpolated value; and
   multiplying the interpolated value by the first axis display coordinate to obtain a calibrated coordinate.

2. The method according to claim 1, wherein the step of detecting the plurality of digital values corresponding to the sensing electrodes when the capacitive sensor is touched comprises:
   detecting a plurality of equivalent capacitances corresponding to the sensing electrodes when the capacitive sensor is touched; and
   transferring the equivalent capacitances into the plurality of digital values.

3. The method according to claim 1, wherein each of the sensing electrodes comprises a constant width.

4. The method according to claim 1, wherein:
   the coordinate corresponding to a first specific sensing electrode, which is nearest to a first edge of the capacitive sensor, is an initial value; and
   the coordinate corresponding to a second specific sensing electrode, which is nearest to a second edge of the capacitive sensor, is the same as the maximum sensing coordinate.

5. The method according to claim 4, wherein when the first edge is located at a minimum display coordinate of the display panel, and the second edge is located at a maximum display coordinate of the display panel:
   the sensing coordinates, corresponding to the sensing electrodes, and a default coordinate are summed up to replace the sensing coordinates, respectively; and
   the maximum sensing coordinate and two times of the default coordinate are summed up to replace the maximum sensing coordinate.

6. The method according to claim 5, wherein when only the digital value corresponding to the second specific sensing electrode is detected:
   it is judged whether the digital value corresponding to the second specific sensing electrode is greater than a reference digital value or not;
   the interpolated value is set as the coordinate corresponding to the second specific sensing electrode when the digital value corresponding to the second specific sensing electrode is greater than or equal to the reference digital value; and
   when the digital value corresponding to the second specific sensing electrode is smaller than a default digital value, the interpolated value is determined according to a ratio of the digital value, corresponding to the second specific sensing electrode, to the default digital value, wherein the interpolated value ranges between the maximum sensing coordinate and the coordinate corresponding to the second specific sensing electrode.

7. The method according to claim 5, wherein when only the digital value corresponding to the second specific sensing electrode is detected:
   it is judged whether the digital value corresponding to the second specific sensing electrode is greater than a reference digital value or not;
   the interpolated value is set as the coordinate corresponding to the second specific sensing electrode when the digital value corresponding to the second specific sensing electrode is greater than or equal to the reference digital value; and
   when the digital value corresponding to the second specific sensing electrode is smaller than the default digital value, the interpolated value is determined according to a look-up table, wherein the interpolated value ranges between the maximum sensing coordinate and the coordinate corresponding to the second specific sensing electrode.

8. The method according to claim 5, wherein when only the digital value corresponding to the first specific sensing electrode is detected:
   it is judged whether the digital value corresponding to the first specific sensing electrode is greater than a reference digital value or not;
   when the digital value corresponding to the first specific sensing electrode is greater than or equal to the reference digital value, the interpolated value is set as the coordinate corresponding to the first specific sensing electrode; and
   when the digital value corresponding to the first specific sensing electrode is smaller than a default digital value, the interpolated value is determined according to a ratio of the digital value, corresponding to the first specific sensing electrode, to the default digital value, wherein the interpolated value ranges between a minimum sensing coordinate and the coordinate corresponding to the first specific sensing electrode.

9. The method according to claim 5, wherein when only the digital value corresponding to the first specific sensing electrode is detected:
   it is judged whether the digital value corresponding to the first specific sensing electrode is greater than a reference digital value or not;
   when the digital value corresponding to the first specific sensing electrode is greater than or equal to the reference digital value, the interpolated value is set as the coordinate corresponding to the first specific sensing electrode; and
   when the digital value corresponding to the first specific sensing electrode is smaller than a default digital value, the interpolated value is determined according to a look-up table, wherein the interpolated value ranges between a minimum sensing coordinate and the coordinate corresponding to the first specific sensing electrode.

10. A method for calibrating coordinates of a touch screen, the method comprising the steps of:
- providing a display panel, which comprises a plurality of display coordinates along a first axis and a first axis display coordinate;
- providing a capacitive sensor, which comprises a plurality of sensing electrodes disposed along the first axis and respectively corresponding to a plurality of sensing coordinates, wherein the capacitive sensor has a maximum sensing coordinate, and the coordinate corresponding to a first specific sensing electrode, which is nearest to a first edge of the capacitive sensor, is an initial value, and the coordinate corresponding to a second specific sensing electrode, which is nearest to a second edge of the capacitive sensor, is the same as the maximum sensing coordinate;
- when the first edge is located at a minimum display coordinate of the display panel and the second edge is located at a maximum display coordinate of the display panel:
- summing up the sensing coordinates, corresponding to the sensing electrodes, and a default coordinate to replace the sensing coordinates; and
- summing up the maximum sensing coordinate and two times of the default coordinate to replace the maximum sensing coordinate, wherein the maximum sensing coordinate is the coordinate of the second edge;
- when it is detected that the first specific sensing electrode, which is nearest to the first edge, is touched:
- judging whether a digital value corresponding to the first specific sensing electrode is greater than a reference digital value or not;
- determining a first edge sensing coordinate according to a ratio of the digital value, corresponding to the first specific sensing electrode, to a default digital value when the digital value corresponding to the first specific sensing electrode is smaller than the reference digital value, wherein the first edge sensing coordinate ranges between the initial value and the sensing coordinate corresponding to the first specific sensing electrode; and
- dividing the first edge sensing coordinate by the maximum sensing coordinate and than multiplying by the first axis display coordinate to obtain a calibrated coordinate; and
- when it is detected that the second specific sensing electrode, which is nearest to the second edge, is touched:
- judging whether a digital value corresponding to the second specific sensing electrode is greater than the reference digital value or not;
- determining a second edge sensing coordinate according to a ratio of the digital value, corresponding to the second specific sensing electrode, to the default digital value when the digital value corresponding to the second specific sensing electrode is smaller than the reference digital value, wherein the second edge sensing coordinate ranges between the maximum sensing coordinate and the sensing coordinate corresponding to the first specific sensing electrode; and
- dividing the second edge sensing coordinate by the maximum sensing coordinate and than multiplying by the first axis display coordinate to obtain the calibrated coordinate.

11. The method according to claim 10, wherein when the capacitive sensor is touched, the method further comprises:
- detecting a plurality of equivalent capacitances corresponding to the sensing electrodes when the capacitive sensor is touched; and
- transferring the equivalent capacitances into the plurality of digital values.

12. The method according to claim 10, further comprising, when the sensing electrodes other than the first specific sensing electrode and the second specific sensing electrode are touched, the steps of:
- detecting a plurality of digital values corresponding to the sensing electrodes;
- multiplying the digital values by the sensing coordinates corresponding to the sensing electrodes to obtain a weighting value;
- dividing the weighting value by a sum of the digital values to obtain an interpolated value; and
- multiplying the interpolated value by the first axis display coordinate to obtain the calibrated coordinate.

13. The method according to claim 10, wherein the step of determining the first edge sensing coordinate comprises:
- providing a look-up table; and
- inputting the digital value corresponding to the first specific sensing electrode to obtain the first edge sensing coordinate.

14. The method according to claim 10, wherein the step of determining the second edge sensing coordinate comprises:
- providing a look-up table; and
- inputting the digital value corresponding to the second specific sensing electrode to obtain the second edge sensing coordinate.

15. A method for calibrating coordinates of a touch screen, the touch screen comprising a display panel and a capacitive sensor, the method comprising the steps of:
- obtaining a coordinate of a touch object along a first axis according to a capacitance variation caused by the touch object with respect to the capacitive sensor;
- adding the coordinate of the touch object to a calibrating value to obtain a first coordinate;
- determining a transferring ratio according to theoretical total coordinates of the capacitive sensor along the first axis and a resolution of the display panel along the first axis; and
- multiplying the first coordinate by the transferring ratio to obtain a second coordinate of the touch object corresponding to the display panel.

16. The method according to claim 15, wherein the step of obtaining the coordinate of the touch object comprises:
- detecting sensing electrodes of the capacitive sensor along the first axis to obtain a plurality of digital values;
- multiplying the plurality of digital values by sensing coordinates corresponding to the sensing electrodes to obtain a weighting value; and
- dividing the weighting value by a sum of the digital values to obtain an interpolated value.

17. A method for calibrating coordinates of a touch screen, the touch screen comprising a display panel and a capacitive sensor, the method comprising the steps of:
- detecting a capacitance variation caused by a touch object with respect to the capacitive sensor along a first axis;
- obtaining a third coordinate corresponding to the capacitance variation according to a look-up table;
- determining a transferring ratio according to theoretical total coordinates of the capacitive sensor along the first axis and a resolution of the display panel along the first axis; and
- multiplying the third coordinate by the transferring ratio to obtain a fourth coordinate of the touch object corresponding to the display panel.

* * * * *